US007418591B2

(12) United States Patent
Tachikawa

(10) Patent No.: US 7,418,591 B2
(45) Date of Patent: Aug. 26, 2008

(54) NETWORK CONFIGURATION METHOD AND COMMUNICATION SYSTEM AND APPARATUS

(75) Inventor: Hirohide Tachikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 744 days.

(21) Appl. No.: 10/616,941

(22) Filed: Jul. 11, 2003

(65) Prior Publication Data
US 2004/0030895 A1 Feb. 12, 2004

(30) Foreign Application Priority Data
Aug. 9, 2002 (JP) ............................. 2002-233119

(51) Int. Cl.
*H04L 9/12* (2006.01)
(52) U.S. Cl. .................... 713/155; 713/168; 380/270
(58) Field of Classification Search ................. 713/155
See application file for complete search history.

(56) References Cited

U.S. PATENT DOCUMENTS

| | | | | |
|---|---|---|---|---|
| 6,148,405 | A | 11/2000 | Liao et al. ................... 713/201 |
| 6,374,355 | B1 | 4/2002 | Patel ........................... 713/168 |
| 6,480,957 | B1 | 11/2002 | Liao et al. ................... 713/170 |
| 6,526,506 | B1 * | 2/2003 | Lewis ......................... 713/153 |
| 6,920,559 | B1 * | 7/2005 | Nessett et al. ............... 713/168 |
| 6,947,725 | B2 * | 9/2005 | Aura ........................... 455/410 |
| 6,996,714 | B1 * | 2/2006 | Halasz et al. ............... 713/163 |
| 7,020,456 | B2 * | 3/2006 | Smeets et al. ............... 455/411 |
| 7,024,553 | B1 * | 4/2006 | Morimoto ................... 713/163 |
| 7,277,547 | B1 * | 10/2007 | Delker et al. ............... 380/270 |
| 2002/0025042 | A1 | 2/2002 | Saito .......................... 380/258 |
| 2002/0061748 | A1 * | 5/2002 | Nakakita et al. ............ 455/435 |
| 2002/0174335 | A1 * | 11/2002 | Zhang et al. ................ 713/168 |
| 2003/0095663 | A1 * | 5/2003 | Nelson et al. ............... 380/270 |
| 2003/0152235 | A1 * | 8/2003 | Cohen et al. ................ 380/278 |
| 2004/0078598 | A1 * | 4/2004 | Barber et al. ............... 713/201 |

OTHER PUBLICATIONS

"Specification of the Bluetooth System", Dec. 1999, Retrieved from the Internet on Oct. 20, 2006: <URL: http://web.ing.puc.cl/docencia/iic3380/documents/Bluetooth_Core_10_B.pdf>.*
Park et al., "Security Protocol for IEEE 802.11 Wireless Local Area Network", 1998, ACM, Retrieved from the Internet on Oct. 20, 2006: <URL: http://portal.acm.org/citation.cfm?id=292121>.*
Salli et al., "Security Design for a New Wireless Local Area Network TUTWLAN", 1998, IEEE, Retrieved from the Internet on Oct. 20, 2006: <URL: http://ieeexplore.ieee.org/iel4/5930/15795/00731455.pdf?arnumber=731455>.*
Uskela, "Security in Wireless Local Area Networks", 1997, Retrieved from the Internet on Oct. 20, 2006: <URL: http://citeseer.ist.psu.edu/uskela97security.html>.*

* cited by examiner

*Primary Examiner*—Gilberto Barron, Jr.
*Assistant Examiner*—Minh Dinh
(74) *Attorney, Agent, or Firm*—Fitzpatrick, Cella, Harper & Scinto

(57) ABSTRACT

A network configuration process establishes, between an access point device and a client terminal, a wireless communication link through a first encrypted communication requiring no authentication process, and sends authentication data from the access point device to the client terminal in a state where the wireless communication link through said first encrypted communication is established. The link through the first encrypted communication is discarded in response to sending of the authentication data. Then, a second link is established through a second encrypted communication that requires an authentication process using the sent authentication data, where the first link is continually discarded.

10 Claims, 10 Drawing Sheets

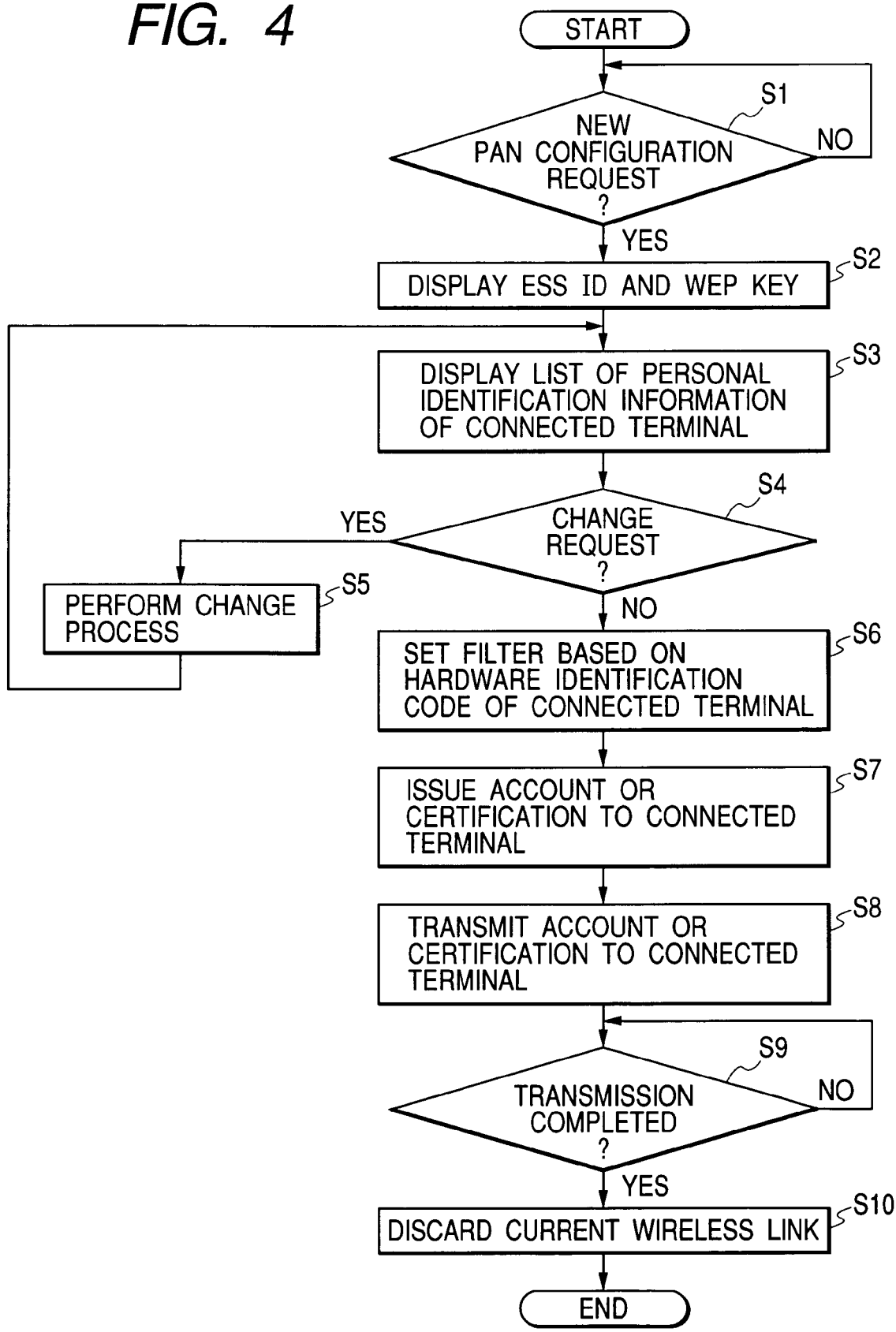

FIG. 5

| NAME | COMPANY NAME | DIVISION | POST |
|---|---|---|---|
| ICHIRO SUZUKI | ××××  | 53RD DEVELOPMENT ROOM | GENERAL MANAGER |
| JIRO SATO | ××××  | DEVELOPMENT AND PLANNING DIVISION | ASSISTANT SECTION CHIEF |
| SABURO SAITO | × TRADING CORP | 2ND SALES DIVISION | CHIEF |
| CHIKASI ITO | × TRADING CORP | 2ND SALES DIVISION | |
| HACHIRO NAKAI | ××××  | 53RD DEVELOPMENT ROOM | |
| AYA MATUDA | ××××  | DEVELOPMENT AND PLANNING DIVISION | |
| DAVID MARTIN | IT CORP. | SALES | MANAGER |

KEYWORD: GCS MEET

[UPDATE]   [DELETE]   [CONFIRM]

FIG. 7

| NAME | COMPANY NAME | DIVISION | POST |
|---|---|---|---|
| ICHIRO SUZUKI | ×××× | 53RD DEVELOPMENT ROOM | GENERAL MANAGER |
| JIRO SATO | ×××× | DEVELOPMENT AND PLANNING DIVISION | ASSISTANT SECTION CHIEF |
| SABURO SAITO | × TRADING CORP | 2ND SALES DIVISION | CHIEF |
| CHIKASI ITO | × TRADING CORP | 2ND SALES DIVISION | |
| HACHIRO NAKAI | ×××× | 53RD DEVELOPMENT ROOM | |
| AYA MATUDA | ×××× | DEVELOPMENT AND PLANNING DIVISION | |
| DAVID MARTIN | IT CORP. | SALES | MANAGER |

KEYWORD: GCS MEET

LOCK RELEASE ~31    UPDATE ~32    DELETE    CONFIRM

NETWORK CONFIGURATION METHOD AND COMMUNICATION SYSTEM AND APPARATUS

BACKGROUND OF THE INVENTION

1. Field of the Invention

The present invention relates to a network configuration method for configuring a high security network and a communication system and apparatus.

2. Related Background Art

Conventionally, in the wireless LAN or Bluetooth, radio wave is employed as its communication medium, whereby it was difficult to restrict the communication destinations. Therefore, in these specifications, protective means was taken to prevent a packet from being decoded by changing a cipher key for each communication destination, even though the packet was peeped through. At present, the most general wireless communication encryption means is a Wired Equivalent Privacy (WEP) key (40 bit, 128 bit) in the case of IEEE802.11 method, or a 128 bit cipher key (128 bit) that is automatically generated from the Personal Identification Number (Pin) code in the case of Bluetooth method.

However, it is pointed out that these encryption methods have a weak point, whereby the encryption methods for enhancing the security of the wireless communication were examined and partially practiced, including a higher encryption method such as a dynamic WEP key conversion (EAP) or a TKIP, AES after practicing authentication of the 802.1x base in the case of the 802.11 method, and an authentication/encryption method on an upper level application layer of the 802.1x base in the case of the Bluetooth method.

Among others, authentication and encryption means called an EAP (Extensible Authentication Protocol) on the 802.1x base is packaged as the standard for the 802.11 method in a part of the OS environments.

In the EAP method of the wireless LAN (802.11), in making a network connection request, the client terminal makes the data communication with an authentication server (RADIUS server) provided within the Intranet, employing the TCP/IP, and conducts a request for certification or a challenge from the authentication server to the client.

The client proves the certification, or returns an account name and a password to the challenge, and when they are matched with data within the authentication server, the authentication server returns a cipher key of 128 bits or cipher key generating means for encrypting the wireless communication to the access point and the client. If the client passes the authentication through this process, the following wireless communication is encrypted using the cipher key of 128 bits as the WEP key between the client and the access point. Moreover, the above process is performed periodically at every fixed interval to update the cipher key.

Also, in the Bluetooth method, it is recommended to employ 802.1x authentication/encryption means in the PAN profile to enhance the security. In the case of the Bluetooth method, since generation of the key to encrypt the radio wave as the wireless medium is automatically performed through the mutual authentication with the Pin code between the devices for making the communication according to the Bluetooth method, the cipher key information received from the authentication server is not employed as the cipher key for radio wave itself, such as the WEP key in the wireless LAN, but may be employed as the key for encrypting the packet at a former stage of generating the radio wave as wireless medium. Thereby, it is possible to enhance the security of communication by dual encryption.

In this way, the authentication server for making the authentication exists in the network to centrally administer the account of client in the same server in an authentication/cipher process of the 802.1x method. Therefore, employing the 802.1x method, it is possible to connect to the network such as the Intranet using the same account and password so long as the communication with the TCP/IP can be made with the authentication server, irrespective of where the client resides.

However, in the conventional wireless connection system, employing the authentication/encryption process of the 802.1x method, the client can implement the safe network connection through the wireless communication, but it is required that the authentication server is installed within the network and the account of the client is registered in advance within the authentication server.

That is, in the 802.1x method, a relatively large-scale operation was supposed for the Intranet or the like, in which there was a restriction that the client making the network connection over the wireless was limited to the member having the account on the authentication server.

Therefore, when conducting a meeting in which the outsiders having no account on the authentication server participate, or in a conference room outside the company without having connection means to the Intranet, there was an inconvenience that the safe network configuration could not be made through the wireless communication making use of the authentication/cipher process based on the 802.1x method.

In this case, though the wireless communication having no authentication/encryption can be implemented, there are naturally some problems from the point of security. Also, when the wireless communication parameters are set manually, the client must manually operate the connection means that is totally different from the automatic connection by entering the account and password of the 802.1x method that is normally employed within the Intranet, although the encryption of the wireless communication is possible. Consequently, the operation method is less uniform, complex and inferior in expediency.

SUMMARY OF THE INVENTION

It is an object of the present invention to configure a relatively safe network simply.

Also, it is another object of the invention to implement a network configuration through the communication by an encryption method having a relatively high security, which requires an authentication process such as IEEE802.1x authentication/encryption method, even in a communication apparatus without possessing in advance the account or certification corresponding to the authentication process.

Also, other objects of the invention will be more clear from the following description and the accompanying drawings.

BRIEF DESCRIPTION OF THE DRAWINGS

FIG. 4 is a flowchart showing a processing procedure of the access point 1 to establish a wireless connection by the IEEE802.11 method according to the first embodiment;

FIG. 5 is a list of personal identification information;

FIG. 7 is a list of personal identification information in a second embodiment;

DESCRIPTION OF THE PREFERRED EMBODIMENTS

The preferred embodiments of a network configuration method such as a PAN (Personal Area Network), a communication system, and a communication apparatus such as an access point device and a client device, according to the present invention will be described below with reference to the accompanying drawings.

First Embodiment

Figure 1:
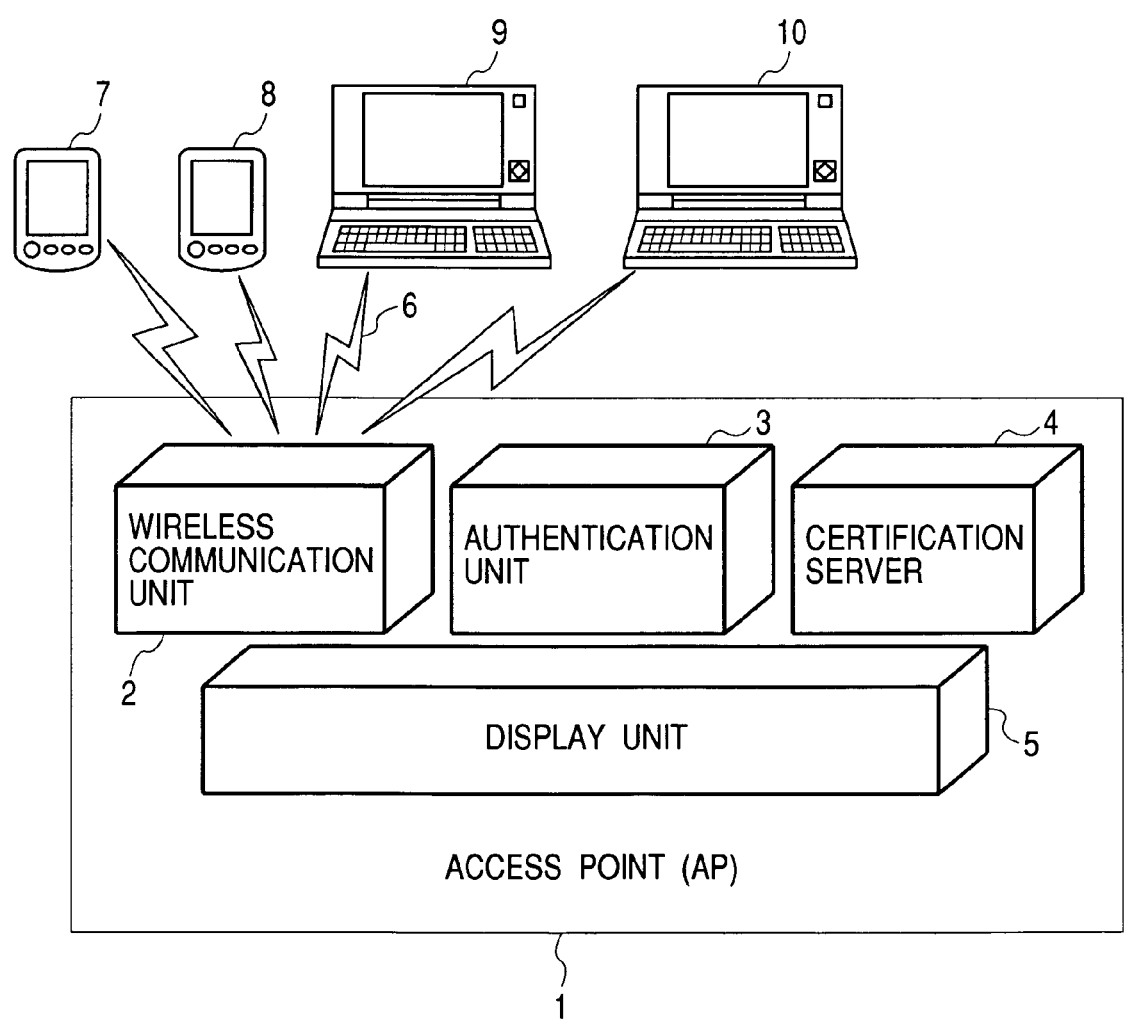
FIG. 1 is a view showing a network system configured by an access point device and a client terminal according to a first embodiment of the present invention.

FIG. 1 is a diagram showing a network system configured by an access point device and a client terminal according to a first embodiment of the invention. In FIG. 1, numeral 1 denotes an access point for configuring a safe network by wireless communication means in accordance with the standards such as IEEE802.11 (hereinafter 802.11) or Bluetooth. Numeral 2 denotes a wireless communication unit comprised in the access point 1. Numeral 3 denotes an authentication server comprised in the access point 1. Numeral 4 denotes a certification server comprised in the access point 1. Numeral 5 denotes a display unit for displaying a message from the access point 1 to the client terminal.

Numeral 6 denotes wireless communication means with, for example, the IEEE802.11 or Bluetooth. Numerals 7 and 8 denote Personal Digital Assistants (PDA) connected over the wireless with the access point 1. Numerals 9 and 10 denote the note PCs connected over the wireless with the access point 1.

Figure 2:
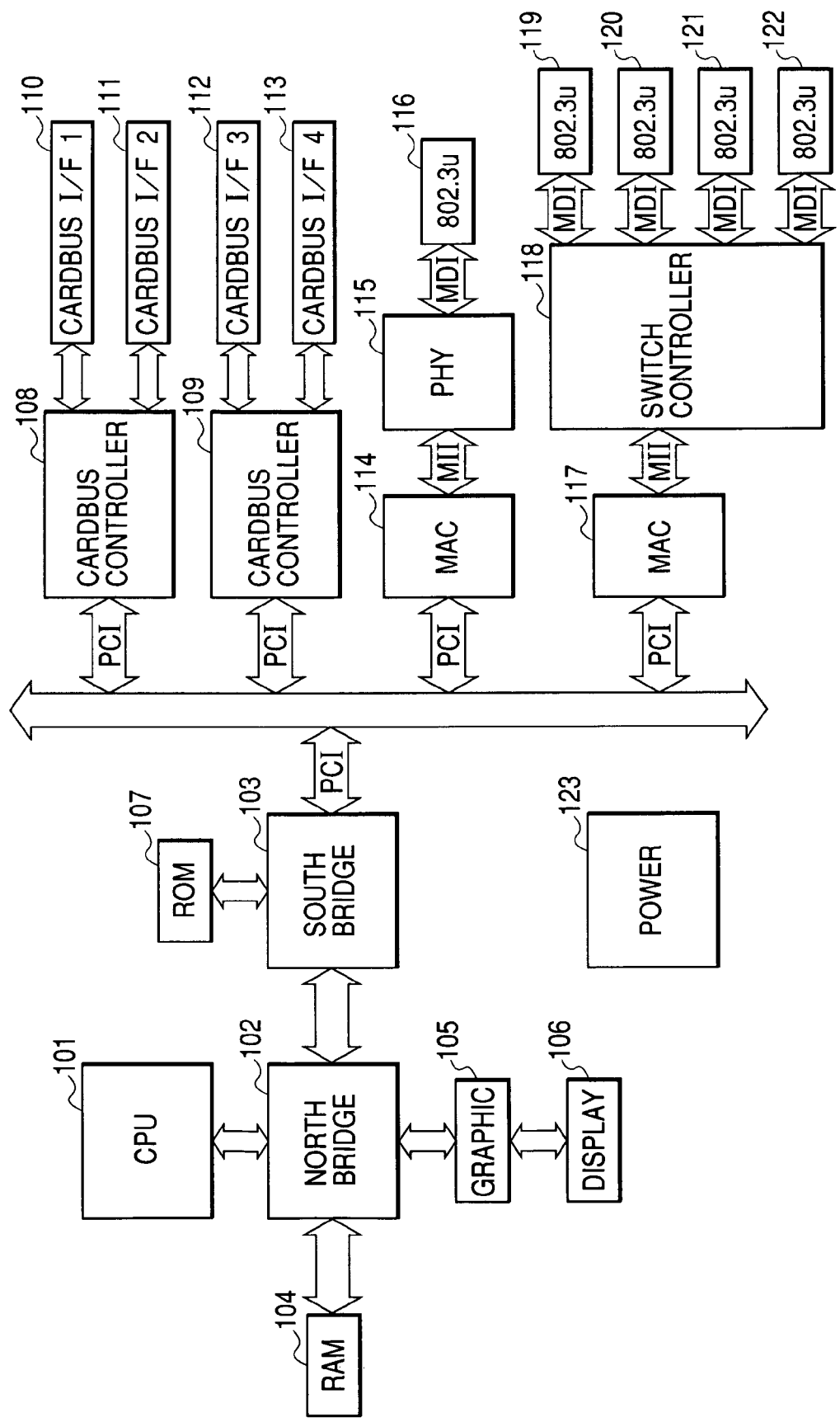
FIG. 2 is a block diagram showing the configuration of an access point 1.

FIG. 2 is a block diagram showing the configuration of the access point 1. In FIG. 2, Numeral 101 denotes a CPU. Numeral 102 denotes a north bridge chip having a memory controller or bus conversion function. Numeral 103 denotes a south bridge for converting a high speed bus output from the north bridge chip 102 to a lower speed general-purpose bus.

Numeral 104 denotes a RAM. Numeral 105 denotes a graphic display chip. Numeral 106 denotes a display device. The graphic display chip 105 and the display device 106 constitute the display unit 5 of FIG. 1. Numeral 107 denotes a ROM for storing the programs and various settings. Numerals 108 and 109 denote bridge chips for making conversion from a PCI bus (Peripheral Component Interconnect Bus) to a standard extended bus such as Cardbus. Numerals 110, 111, 112 and 113 denote extended bus interfaces corresponding to various wireless communication methods by inserting a wireless communication extension card.

Numeral 114 denotes a cascade connecting MAC (Media Access Control). Numeral 115 denotes a cascade connecting PHY (Physical layer). Numeral 116 denotes a cascade connecting IEEE802.3u interface. Numeral 117 denotes a PAN configuring MAC through the wired network. Numeral 118 denotes a PAN configuring switching controller through the wired network. Numerals 119, 120, 121 and 122 denote the PAN configuring interfaces through the wired network. Numeral 123 denotes a power supply unit for supplying electric power to the above circuits.

The extended bus interfaces 110, 111, 112 and 113 have all the same function, whereby the extension card can function at the access point by inserting the extension card having a wireless communication function into this interface. Also, the access point capable of handling a plurality of wireless communication means at the same time may be configured by inserting the wireless communication extension card having a plurality of extended bus interfaces and corresponding to different wireless communication means such as Bluetooth, 802.11 b and 802.11a. Moreover, if a plurality of wireless communication extension cards corresponding to the same communication means are inserted, one access point device can cope with a number of users more than handled by one wireless communication extension card. Also, routing or filtering for each user is performed for the client terminal of wireless communication connected via the access point to a basic network to prohibit illegal access from each other. Moreover, a routing function of access point, an authentication server function, and an authentication server account or certification generating function (certification server function) are implemented by the single CPU 101 and its peripheral circuit, whereby the cost of production is reduced.

Figure 3:
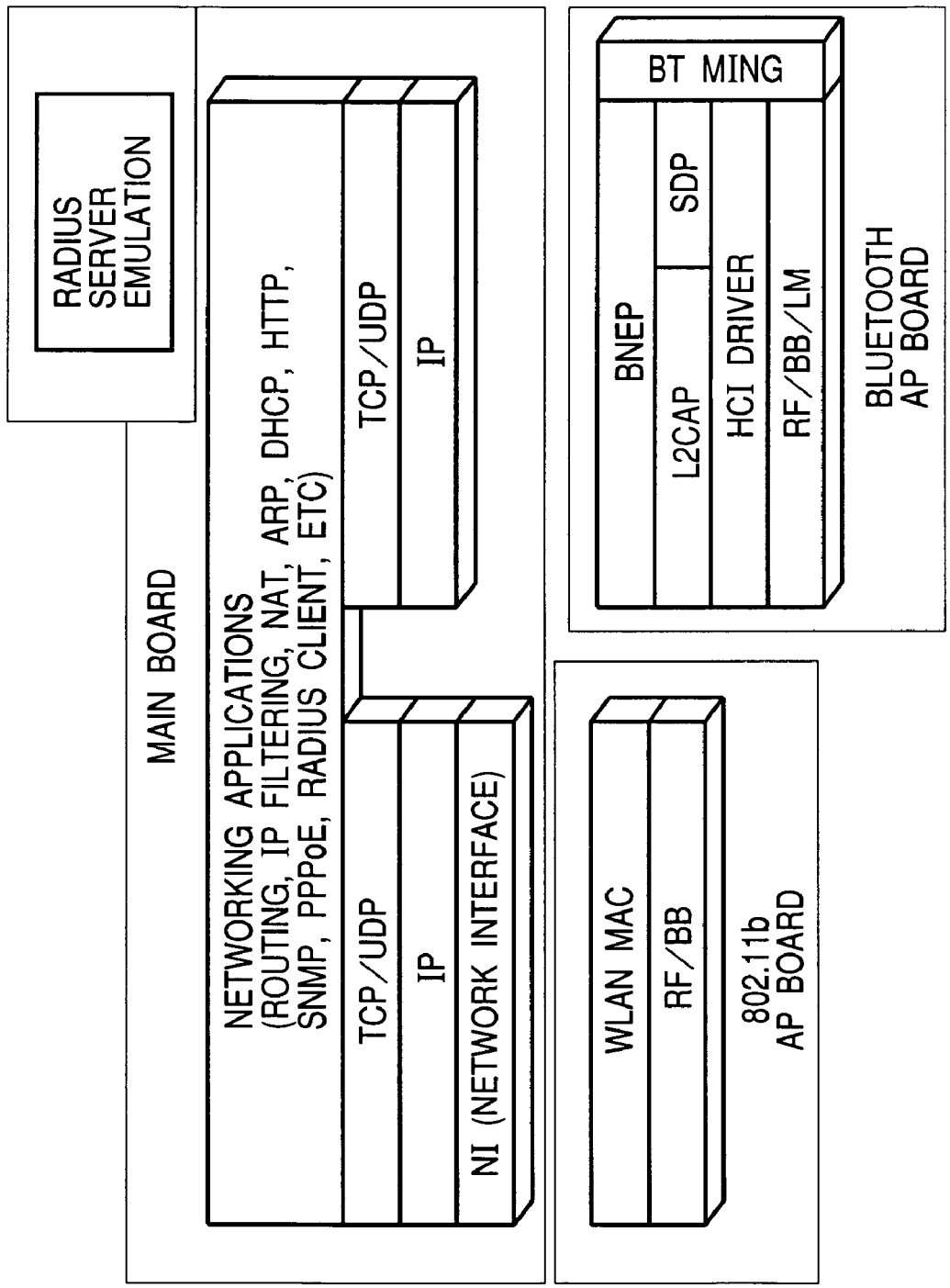
FIG. 3 is a diagram showing the software configuration of the access point device.

FIG. 3 is a diagram showing the software configuration of the access point device. An emulation function of the authentication server (RADIUS server, etc.) and a TCP/IP stack for implementing the access point or the like are provided on a main block (Main Board) of FIG. 2 to handle different kinds of wireless communication means in flexible manner and suppress the total cost of the system.

The operation for configuring the PAN through the wireless communication employing the access point 1 having the above configuration will be described below. In configuring the PAN through the wireless communication, if a start operation for the access point 1 is performed or some switch input is made, the access point 1 displays the information necessary for establishing the wireless connection with low level encryption on the display unit 5. At this time, the display may include a parameter itself used to encrypt the wireless communication by the 802.11 or Bluetooth such as the ESS ID (Extended Service Set ID), WEP (Wired Equivalent Privacy) key or Pin (Personal Identification Number) code. Also, it may be a keyword to be automatically converted into the parameter to encrypt the wireless communication by a program installed beforehand in the client terminals 7, 8, 9 and 10 possessed by the user.

Figure 10:
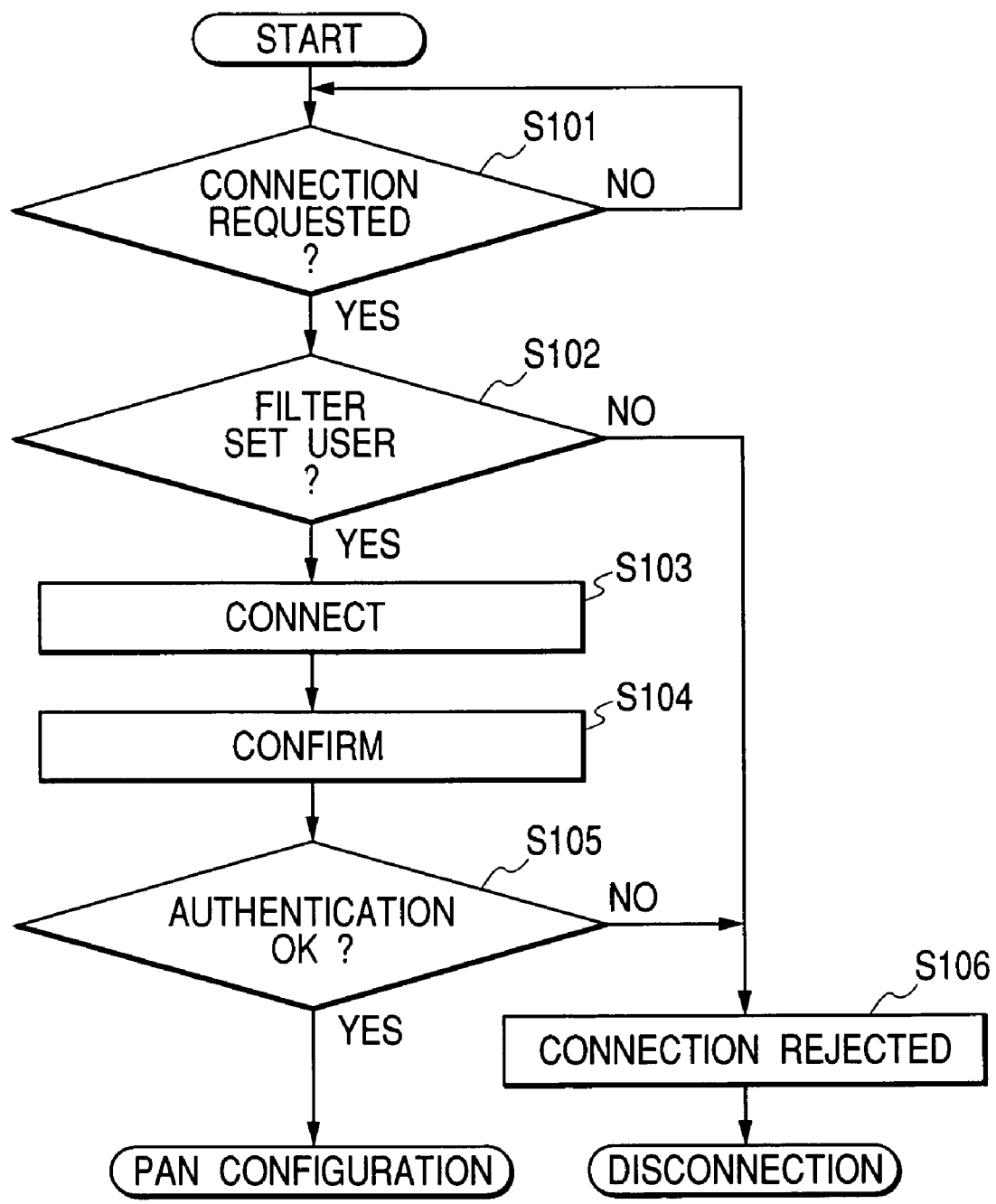
FIG. 10 is a flowchart showing a processing procedure of the client terminal to establish a wireless connection by the IEEE802.11 method according to the first embodiment.

FIGS. 4 and 10 are flowcharts showing a processing procedure of the access point 1 to establish the wireless connection by the 802.11 method.

Figure 9:
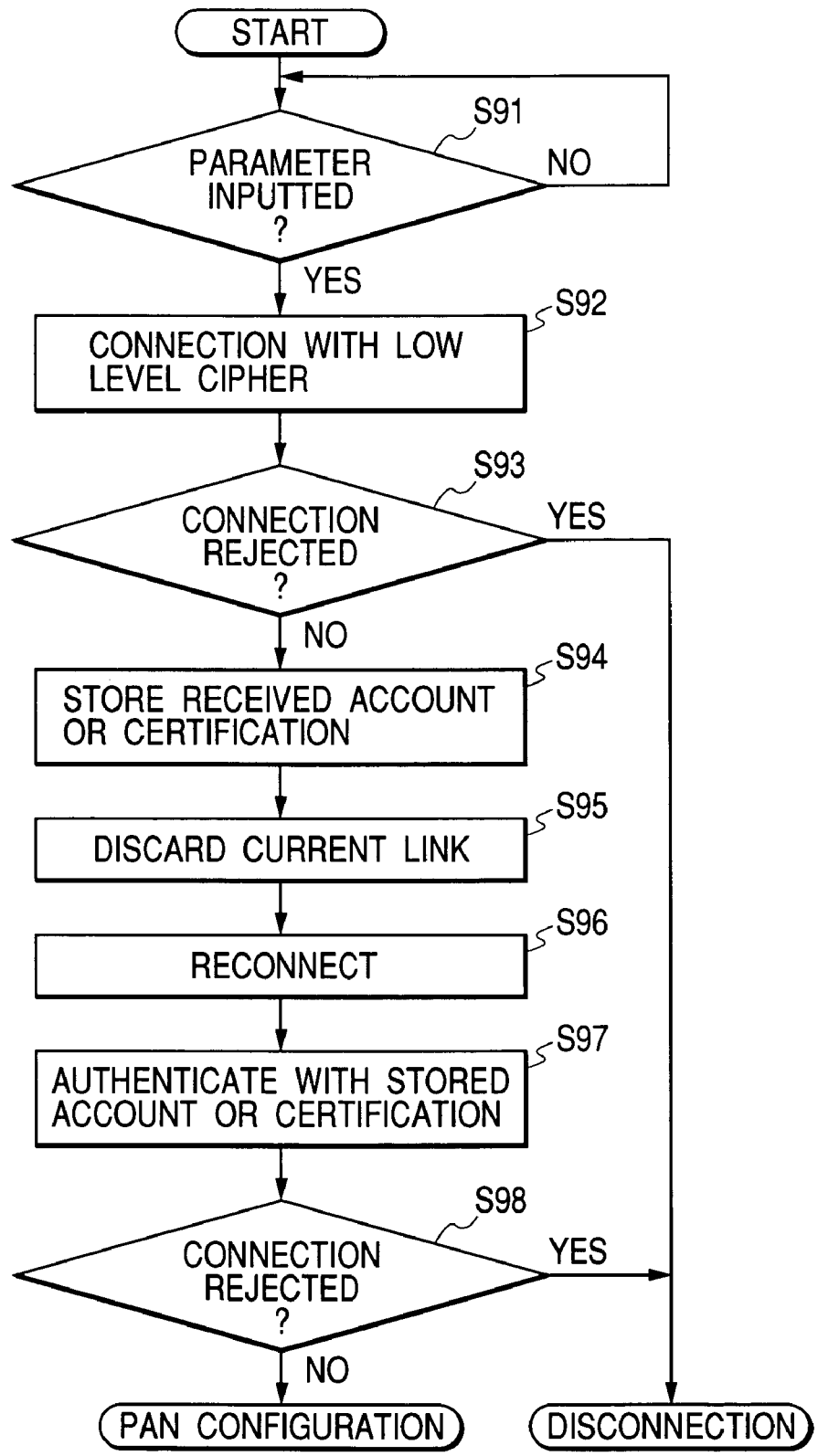
FIG. 9 is a flowchart showing a processing procedure of the access point 1 to establish a wireless connection by the IEEE802.11 method according to the first embodiment.

Also, FIG. 9 is a flowchart showing a processing procedure of the client terminals 7, 8, 9 and 10 to establish the wireless connection by the 802.11 method.

First of all, the procedure waits for a new PAN configuration request to be made by start of the access point 1 or switch input (step S1), as previously described. When the PAN configuration request is made, the access point 1 displays on the display unit 5 the ESS ID and the WEP key that are the parameters necessary for the wireless communication with low level encryption by the 802.11 method (step S2).

Herein, the user at the client terminal who tries to connect to the PAN manually inputs these displayed parameters into the client terminals 7, 8, 9 and 10 possessed by the user (step S91). By this operation, the wireless communication with low level encryption is established between the access point 1 and each of the client terminals 7, 8, 9 and 10 (step S92).

At this time, since it is necessary to establish the connection on the TCP/IP base, each of the client terminals 7, 8, 9 and 10 automatically issues an IP address, employing a DHCP function or the like contained in the access point 1, after establishing a link at the wireless level with low level encryption, and establishes a network connection with the TCP/IP.

Thereafter, the access point 1 displays a list of the information of the client terminals 7, 8, 9 and 10 connected over the wireless to itself on the display unit 5 of the access point 1 (step S3). The information of the client terminal displayed at this time may be a hardware identification code of the connected wireless terminal. In this case, however, the responsible person in charge of the PAN needs to grasp in advance the hardware identification code of each client terminal to designate the person making illegal access.

However, the management of the hardware identification code is very complex for the user. Thus, the user trying to configure the PAN installs in advance a software for supporting the PAN configuration in the client terminals 7, 8, 9 and 10 possessed by oneself, in which the personal identification information such as the name and division of the client terminal user is input. When the wireless connection with low level encryption is established through this procedure, each client terminals 7, 8, 9 and 10 transmits the personal identification information to the access point 1, so that the access point 1 displays a list of the personal identification information of the client terminals 7, 8, 9 and 10 connected over the wireless to itself.

FIG. 5 shows a list of the personal identification information. The responsible person in charge of the PAN makes arbitrary edit and visually confirms that there is no illegal PAN participant by seeing the list of users connected through the wireless communication, and then makes a switch input to notify the access point 1 that the confirmation for the PAN participant has been completed. That is, the access point 1 displays a list of the personal identification information of the client terminals 7, 8, 9 and 10 connected over the wireless at step S3, and then determines whether or not any change request is made by the user operation at the access point 1 (step S4). If the change request is made, a change operation is performed based on the user operation (step S5), and the procedure returns to step S3. On the other hand, if the confirmation operation completion is input as no change request, the procedure transfers to step S6. As a result of the change operation at steps S4 and S5, the access point 1 refuses the connection to the client terminal that is not accepted to connect to the user of the access point 1. The client terminal that is refused to connect to the access point 1 (step S93) disconnects the wireless communication with low level encryption from the access point 1.

Also, the access point 1 sets the filter based on the hardware identification code using the MAC address or the like of the confirmed user (client terminal) to refuse the PAN participants except for the confirmed users, when the confirmation operation completion at step S4 is input (step S6). This filter setting may be made by automatically setting the MAC address of the confirmed user name, employing a user control function based on the MAC address that the typical wireless LAN access point has.

Also, the access point 1 issues an authentication account or a certification to all the client terminals that have been confirmed at the same time (step S7). The authentication account or certification is transmitted to all the client terminals (step S8), and a determination is made whether or not the transmission is completed (step S9). If the transmission is completed, the access point 1 once discards the current link through the wireless communication with low level encryption (step S10), and preparing to start the wireless communication with high level encryption requiring the authentication process such as EAP, this procedure is ended.

The client terminals 7, 8, 9 and 10 receive the authentication account or certification from the access point 1, and stores it (step S94). After discarding the link through the wireless communication with low level encryption (step S95), the client terminal automatically starts a connection protocol for performing the wireless communication with relatively high level encryption requiring the authentication process such as EAP, employing the authentication account or certification received in the link, and makes the wireless connection with the access point 1 again (step S96).

At this time, the client terminals 7, 8, 9 and 10 transfers to the wireless communication with relatively high level encryption requiring the authentication process such as EAP, employing the same ESS ID as used in the previous link through the wireless communication with relatively low level encryption. This is made to surely guide and connect the client terminals 7, 8, 9 and 10 to the access point 1 having issued the authentication account or certification.

After the access point 1 discards the link through the wireless communication with low level encryption, if there is a connection request from the client terminal (step S101), it is checked whether or not the client terminal has the filter set at step S6 (step S102). By this judgement, if the client terminal making a request for connection is an object of connection refusal, the connection is refused (step S106). If it is not the object of connection refusal, the access point 1 makes the wireless connection with its client terminal (step S103).

If the access point 1 and the client terminal are connected again at steps S96 and S103, the client terminal transmits the account or certification stored at step S94 to the access point 1 and makes the authentication for the client terminal in the authentication server 3 within the access point 1 (steps S97, S104). As a result of this authentication, if the authentication server 3 within the access point 1 determines that the client terminal is legal, the PAN is configured of the access point 1 and the client terminal that has passed the authentication.

If the authentication server 3 within the access point 1 determines that the client terminal is invalid, the connection with that client terminal is refused (steps S98, S105, S106) to disconnect the wireless communication with that client terminal.

Figure 6:
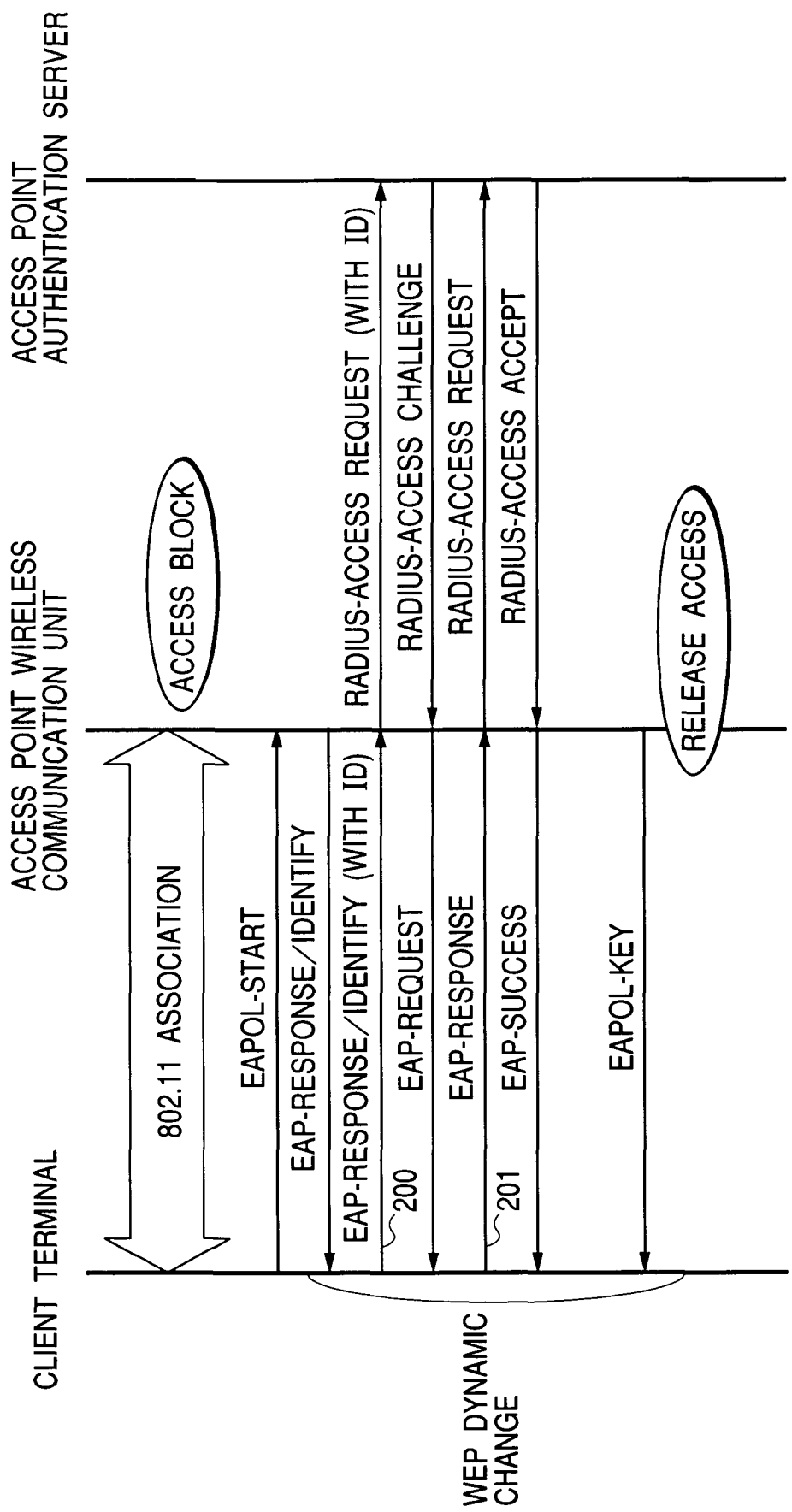
FIG. 6 is a transition diagram showing the transition of data between the client terminals 7, 8, 9 and 10, a wireless communication unit 2 within the access point 1 and an authentication server 3 within the access point 1 in making authentication with the EAP.

FIG. 6 is a transition diagram showing the transition of data between the client terminals 7, 8, 9 and 10, the wireless communication unit 2 within the access point 1, and the authentication server 3 within the access point 1 in making the authentication with EAP. The client terminals 7, 8, 9 and 10 transmit EAP-Response (200, 201) twice to the authentication server 3 within the access point 1 via the wireless communication unit 2 within the access point 1.

Thereby, the client terminal transmits a set of account and password or the certification data to authenticate that the client terminal is registered in the authentication server. As a result, if the authentication is passed, the network access of the client terminal is permitted, and then the wireless communication with relatively high level encryption is realized by dynamically changing the WEP key set between the client terminals 7, 8, 9, 10 and the wireless communication unit 2 within the access point 1 at every fixed interval.

In the first embodiment, the keyword such as ID or Code in making the wireless connection with relatively low level encryption, or a list of PAN participants in editing is displayed on the display unit 5 of the access point 1. This display may be intermittently made on the client device connected to the PAN configuring interface 119, 120, 121 and 122 across the wired network, employing the WEB browser. In this case, there is no need for providing the display unit or input switch in the access point 1, which is effective to reduce the cost.

Second Embodiment

Though the operation of newly configuring the PAN is described in the first embodiment, the operation of configuring the PAN actually will be described, giving an example of a conference, from the viewpoint of the function required for the PAN in holding the conference in the second embodiment.

Herein, in configuring the PAN for mutually connecting the client terminals at the time of holding the conference, the use of the wireless connection with relatively high level encryption is very favorable from the point of the user's expediency as described in the first embodiment.

When the conference PAN is configured, it is required that the account or certification issued to each user is not permanent, but temporarily effective only during the conference. Therefore, when the access point is employed for the conference, a step of inputting the scheduled time of conference by the responsible person in charge of the PAN, who is the user of the access point 1, is added after a new PAN configuration request is made at step S1 in FIG. 4, and before performing the processing at step S2.

By adding this input step, the effective period of account is set in the authentication server, or the effective period of issued certification is reflected as the parameter within the certification, whereby it is possible to afford the effective period to the PAN through the wireless connection with relatively high level encryption requiring the authentication process.

Also, if the confirmation operation by the responsible person in charge of the PAN is ended, the PAN is placed in a lock state through the MAC address filtering or the like to prohibit the new user from participating, as described in the first embodiment.

However, when the access point 1 is employed in the environment of the conference, a case is supposed in which the PAN is once locked and the client terminal is added because the latecomer appears, for example. In such case, the responsible person in charge of the PAN directly operates the access point 1 in viewing the latecomer, or initiates a management screen of the access point 1 and intermittently operates the access point 1 to release the locked state, employing the WEB browser at the client terminal 9 that the responsible person in charge uses.

FIG. 7 is a list of the personal identification information in a second embodiment of the invention. A "lock release" button 31 is provided on this screen, unlike the screen of FIG. 5. By clicking on this "lock release" button 31, the restricted participation through the MAC address filtering of the PAN is released.

At this time, the responsible person in charge of the PAN passes the ID or Code information displayed as Keyword in the figure to the latecomer. Herein, Keyword is "GCSmeet". Thereafter, the user trying to additionally participate in the PAN initiates the application at the client terminal owned by oneself, and inputs Keyword. The keyword input here may be the parameter itself for encrypting the wireless communication by the 802.11 or Bluetooth such as the ESS ID, WEP key or Pin code that is input by each user in performing the wireless connection with relatively low level encryption as previously described in the first embodiment. In this embodiment, the keyword that is automatically converted into the parameter is finally employed.

Figure 8:
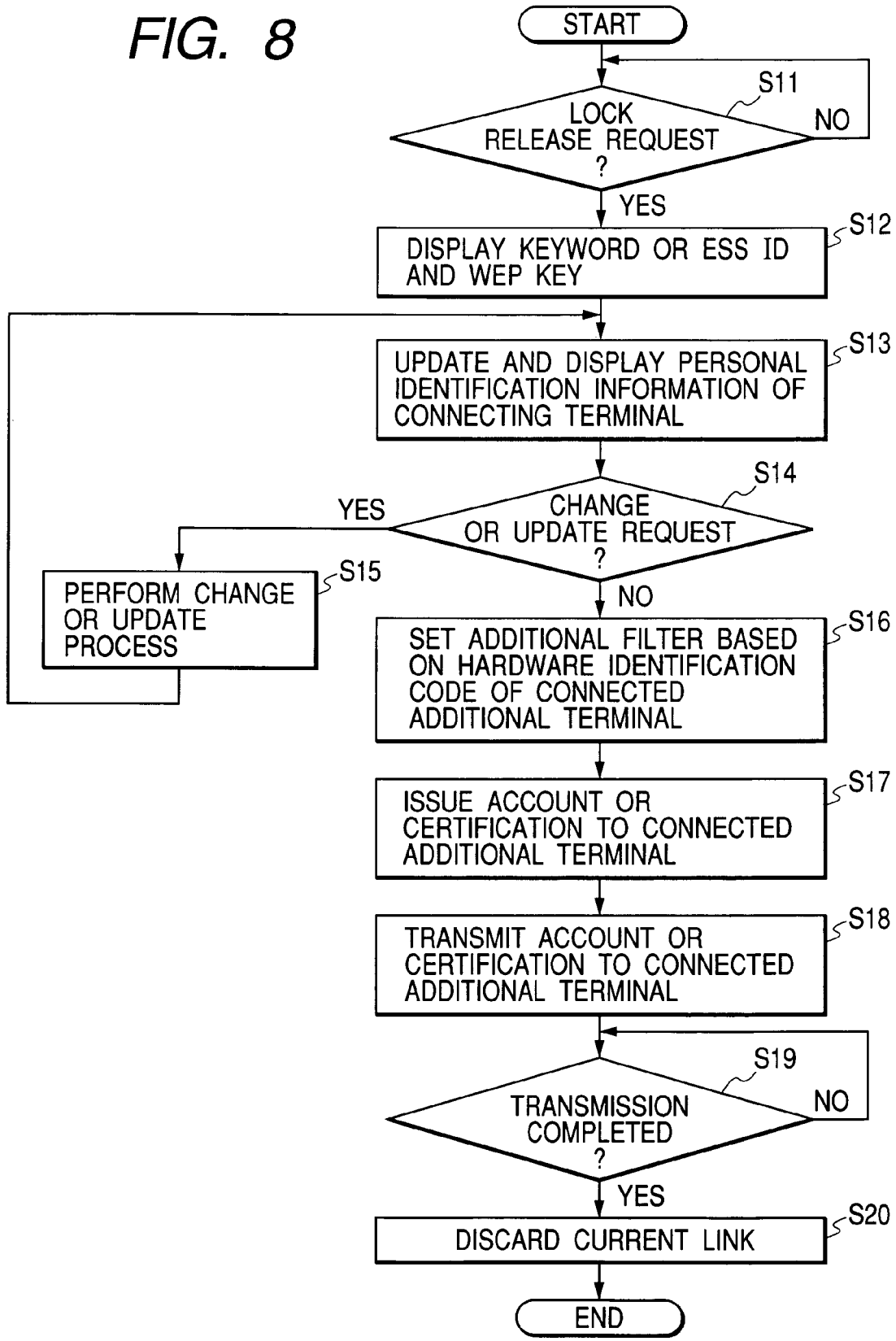
FIG. 8 is a flowchart showing a processing procedure of an additional client to establish a wireless connection by the 802.11 method according to the second embodiment.

FIG. 8 is a flowchart showing a processing procedure of the access point 1 to establish the wireless connection with the additional client by the 802.11 method in the second embodiment. It is determined whether or not a lock release request is made (step S11). If the lock release request is made, the access point 1 displays the ESS ID and the WEP key that are parameters necessary for the wireless communication with low level encryption by the 802.11 method (step S12).

If the keyword is input into the client terminal, this client terminal tries to make the wireless connection with low level encryption to the access point in which the PAN is already formed by other users. The access point 1 recognizes the client terminal that is about to additionally participate in the PAN, and then updates the display on the screen to add the personal information of additionally participating user to the list (step S13).

This postscript may be added by clicking on an "update" button 32 as shown in FIG. 7. The responsible person in charge of the PAN confirms an updated list, and if the illegal user is displayed, an edit operation is made to delete the illegal user. That is, it is determined whether or not there is a change request (step S14). If there is the change request, the change operation is performed (step S15), and the operation returns to step S13. On the other hand, when the confirmation operation completion is input as no change request, the procedure transfers to step S16.

The access point 1 updates the filter setting based on the hardware identification code using the MAC address or the like of the confirmed user to refuse the PAN participation except for the confirmed users, when the confirmation operation completion is input, as in the first embodiment (step S16). Also, the access point 1 issues the authentication account or certification to the additional client terminal newly confirmed at the same time (step S17).

The access point 1 transmits the authentication account or certification to the additional client terminal (step S18), and waits for the completion of transmission (step S19). If the transmission is completed, the access point 1 discards the current link through the wireless communication with low level encryption to the additional client terminal (step S20), and preparing to start the wireless communication with high level encryption requiring the authentication process, this procedure is ended.

Needless to say, when the additional operation of the latecomer to the PAN is performed, other PAN participants can continually maintain the wireless connection with relatively high level encryption requiring the authentication process, and continue the operation on the PAN.

Also, after discarding the link through the wireless communication with low level encryption, the additional client terminal automatically starts a connection protocol for making the wireless communication with relatively high level encryption requiring the authentication process such as EAP or the like, employing the authentication account or certification received in the link. At this time, it goes without saying that the additional client terminal is selectively connected with the account point 1, employing the same ESS ID as used in the previous link through the wireless communication with relatively low level encryption.

Thereby, the additional client terminal transmits EAP-Response (200, 201) twice to the authentication server 3 within the account point 1 via the wireless communication unit 2 within the account point 1 to pass a set of account and password or the certification data, whereby the additional client terminal itself is authenticated as the client terminal registered in the authentication server, as in the first embodiment.

As a result, if the authentication is passed, the network access of the additional client terminal is permitted, and then the wireless communication with relatively high level encryption is realized by dynamically changing the WEP key at every fixed interval.

In this manner, a wireless communication apparatus capable of controlling the encryption level independently is required to configure the wireless connection with relatively low level encryption at the same time while maintaining the wireless connection with relatively high level encryption requiring the authentication process. However, when the access point is capable of mounting a plurality of wireless communication extension cards as in this embodiment, this communication apparatus is easily realized by mounting the plurality of wireless communication extension cards.

Also, when a controller capable of implementing the wireless communication with different encryption level by one chip is employed, the process of the second embodiment may be performed by only one sheet of wireless communication extension card without packaging the plurality of wireless communication extension cards in the access point.

This invention may be also applicable to the case where the program code of software for implementing the functions of the embodiments is supplied to the system or apparatus. In this case, the program code itself realizes the new functions of the invention, and the program itself or the storage medium storing program may constitute this invention.

The storage medium for supplying the program code is not limited to the ROM, but may be a flexible disk, a hard disk, a CD-ROM, a CD-R, a DVD, or a non-volatile memory card, for example.

As described above, with this invention, the wireless network with relatively high level encryption requiring the authentication process is easily configured for the user who does not acquire in advance the account or certification. This invention is particularly suitable in the cases where it is demanded to temporarily configure the safe network for conference or the like.

In this manner, the PAN configuration employing the wireless communication by the encryption method of relatively high security requiring the authentication process of the 802.1x authentication/encryption method or the like is also implemented at the client terminal possessing in advance no account or certification corresponding to the authentication process.

Also, the wireless communication means for use in configuring the PAN is simply selected. Moreover, a plurality of wireless communication means are usable at the same time in configuring the PAN, and the PAN configured by different wireless communication means is simply implemented. Also, the PAN is configured of a number of clients more than the number of users dealt with by one card, and the load distribution over the clients is realized. Accordingly, it is possible to increase the total number of clients capable of participating in the PAN owing to the wireless communication means.

Moreover, when the PAN configured by the wireless communication means is connected to the basic network such as the Intranet or Internet, the illegal access is prohibited mutually. Also, the cost of producing the access point is reduced.

Moreover, in configuring the PAN through the wireless communication by the encryption method of relatively high security requiring the authentication process by the client terminal possessing in advance no account or certification, the operation of the client is facilitated. Also, it is possible to facilitate the setting operation on the access point side when connecting the access point to the client terminal possessing in advance no account or certification.

Also, it is possible to provide final confirmation means for checking whether or not the client of the PAN configured through the wireless communication is consistent. Moreover, the client conditions for participating in the PAN through the wireless communication are prevented from being changed without authority after confirmation. Accordingly, the client is not added without authority to the PAN through the wireless communication. Also, in transferring to the wireless communication with relatively high encryption means requiring the authentication process, the client terminal is selectively connected over the wireless to the access point capable of making the authentication for that client.

What is claimed is:

1. A network configuration method of configuring a wireless network, comprising:

an access point device receiving a network configuration request for configuring a new wireless network comprising the access point device and at least one client terminal;

a first display step of displaying a first cipher key and a network identifier on a display unit of the access point device, the first cipher key and the network identifier being used for establishing a first wireless communication link through a first encrypted communication that does not require an authentication process;

a first link establishing step of establishing, between the access point device and a client terminal, the first wireless communication link by inputting the first cipher key and the network identifier into the client terminal;

a second display step of displaying information of the client terminal on the display unit of the access point device, the first wireless communication link having been established between the client terminal and the access point device in the first link establishing step;

a determination step of determining whether the client terminal is to be authorized to participate in the network which is configured with a second wireless communication link through a second encrypted communication that requires the authentication process, where the client terminal is determined on the basis of a user operation of selecting information of a client terminal from among a plurality of information of client terminals which are displayed in the second display step;

a sending step of, if the determination step determines that the client terminal is authorized to be configured in the network with the access point device, the access point device sending authentication data from said access point device to said client terminal in a state where the first wireless communication link through said first encrypted communication is established;

a link discarding step of discarding the first wireless communication link through said first encrypted communication between said access point device and said client terminal in response to the sending of the authentication data to the client terminal by the access point device at said sending step; and a second link establishing step of establishing, between said access point device and said client terminal, the second wireless communication link through the second encrypted communication that requires the authentication process using the authentication data sent to said client terminal after discarding the first communication link at said link discarding step, the second wireless communication link having the same network identifier as that of the first wireless communication link.

2. The network configuration method according to claim 1, further comprising a selection step of selecting a client terminal to be permitted with said second encrypted communication from among information of a plurality of client terminals displayed on the display unit with which a link is established at said first link establishing step, wherein said sending step sends the authentication data to said client terminal selected at said selection step.

3. The network configuration method according to claim 2, wherein said selection step comprises making said selection on the basis of a user operation.

4. The network configuration method according to claim 1, further comprising a selection step of selecting a client terminal to be permitted with said second encrypted communication from among information of a plurality of client terminals displayed on the display unit with which a link is established at said first link establishing step, and a filter setting step of setting address filtering based on the selection at said selection step.

5. The network configuration method according to claim 1, wherein said second link establishing step comprises establishing the second wireless communication link through said second encrypted communication in accordance with an authentication result from said authentication process.

6. The network configuration method according to claim 1, wherein the authentication in said authentication process is performed by said access point device.

7. The network configuration method according to claim 1, further comprising a creation step of creating the authentication data sent at said sending step.

8. The network configuration method according to claim 1, wherein the authentication data sent at said sending step is effective for a fixed period of time.

9. A wireless communication system comprising:
network configuration request receiving means for receiving, from a client terminal to an access point device, a request for configuring a new wireless network comprising the client terminal and the access point device;
a display unit of the access point device for displaying a first cipher key and a network identifier, the first cipher key and the network identifier being used for establishing a first wireless communication link through a first encrypted communication that does not require an authentication process;
first link establishing means for establishing, between the access point device and the client terminal, the first wireless communication link by inputting the first cipher key and the network identifier into the client terminal, wherein when the first wireless communication link has been established between the access point and the client terminal, information of the client terminal is displayed on the display unit of the access point device;
determination means for determining whether the client terminal is to be authorized to participate in the network which is configured with a second wireless communication link through a second encrypted communication that requires the authentication process, where the client terminal is determined on the basis of a user operation of selecting information of a client terminal from among a plurality of information of client terminals which are displayed on the display unit;
sending means for, if the determination means determines that the client terminal is authorized to be configured in the network with the access point device, sending authentication data from said access point device to said client terminal in a state where the first wireless communication link through said first encrypted communication is established;
link discarding means for discarding the first wireless communication link through said first encrypted communication between said access point device and said client terminal in response to the sending of the authentication data to the client terminal by said sending means; and
second link establishing means for establishing, between the access point device and the client terminal, the second wireless communication link through the second encrypted communication that requires the authentication process using the authentication data sent to said client terminal, after discarding the first communication link by said link discarding means, the second wireless communication link having the same network identifier as that of the first wireless communication link.

10. An access point device for a wireless communication network, comprising:
network configuration request receiving means for receiving, from a client terminal, a request for configuring a new wireless communication network comprising the client terminal and the access point device;
a display unit for displaying a first cipher key and a network identifier, the first cipher key and the network identifier being used for establishing a first wireless communication link through a first encrypted communication that does not require an authentication process;
first link establishing means for establishing, between the access point device and the client terminal, the first wireless communication link by inputting the first cipher key and the network identifier into the client terminal, wherein when the first wireless communication link has been established between the access point and the client terminal, information of the client terminal is displayed on the display unit of the access point device;
determination means for determining whether the client terminal is to be authorized to participate in the network which is configured with a second wireless communication link through a second encrypted communication that requires the authentication process, where the client terminal is determined on the basis of a user operation of selecting information of the client terminal from among a plurality of information of client terminals which have been displayed on the display unit;
sending means for, if the determination means determines that the client terminal is authorized to be configured in the network with the access point device, sending authentication data to said client terminal in a state where the first wireless communication link is established by said first link establishing means;
link discarding means for discarding the first wireless communication link established by said first link establishing means between said client terminal and said access point device, in response to the sending of the authentication data to the client terminal by said sending means; and
second link establishing means for establishing, between said client terminal and said access point device, the second wireless communication link through the second encrypted communication that requires the authentication process using the authentication data sent to said client terminal, after discarding the first communication link by said link discarding means, the second wireless communication link having the same network identifier as that of the first wireless communication link.

* * * * *

UNITED STATES PATENT AND TRADEMARK OFFICE
CERTIFICATE OF CORRECTION

| | | |
|---|---|---|
| PATENT NO. | : 7,418,591 B2 | |
| APPLICATION NO. | : 10/616941 | |
| DATED | : August 26, 2008 | |
| INVENTOR(S) | : Hirohide Tachikawa | |

It is certified that error appears in the above-identified patent and that said Letters Patent is hereby corrected as shown below:

<u>COLUMN 1</u>:
       Line 14, "was" should read -- is --.

<u>COLUMN 2</u>:
       Line 14, "is" should read -- be --; and
       Line 15, "is" should read -- be --.

<u>COLUMN 4</u>:
       Line 16, "802.11 b and" should read -- 802.1lb and --; and
       Line 34, "flexible" should read -- a flexible --.

<u>COLUMN 5</u>:
       Line 28, "client" should read -- of client --.

<u>COLUMN 6</u>:
       Line 10, "stores" should read -- store --;
       Line 18, "transfers" should read -- transfer --;
       Line 23, "made" should read -- done --; and
       Line 42, "of" should read -- from --.

<u>COLUMN 7</u>:
       Line 4, "interface" should read -- interfaces --; and
       Line 21, "is not" should read -- not be --.

UNITED STATES PATENT AND TRADEMARK OFFICE
CERTIFICATE OF CORRECTION

PATENT NO. : 7,418,591 B2
APPLICATION NO. : 10/616941
DATED : August 26, 2008
INVENTOR(S) : Hirohide Tachikawa It is certified that error appears in the above-identified patent and that said Letters Patent is hereby corrected as shown below:

COLUMN 9:
Line 19, "level" should read -- levels --.

Signed and Sealed this

Seventeenth Day of March, 2009

JOHN DOLL
*Acting Director of the United States Patent and Trademark Office*